Patented Mar. 6, 1945

2,370,987

UNITED STATES PATENT OFFICE 2,370,987

PRESERVING RUBBER

Arthur M. Neal and John R. Vincent, Wilmington, Del., assignors to E. I. du Pont de Nemours & Company, Wilmington, Del., a corporation of Delaware No Drawing. Application June 23, 1943, Serial No. 491,912

20 Claims. (Cl. 260—809)

This invention relates to the preservation of rubbers and more particularly to novel means of improving the resistance of rubber to deterioration at high temperatures.

Many substances have been proposed for addition to rubbers to improve the resistance of the rubbers to deterioration by the action of oxygen and the like. Among the substances proposed for this purpose are secondary aromatic amines, of which N-phenyl-beta-naphthylamine has been widely used. While the secondary aromatic amines of this character have been quite satisfactory at ordinary temperature, they are relatively ineffective at elevated temperatures in the neighborhood of about 120 to 130° C. N,N'-diphenyl-benzidine has also been proposed as a preserving agent for rubber. While this compound is somewhat more effective at elevated temperatures, there is available no simple method of preparing it and thus it has been much too costly for use practically on a commercial scale.

It is an object of the present invention to provide a new and improved method of inhibiting the deterioration of rubbers, particularly at elevated temperatures. Another object is to provide a method for improving the antioxidant properties of secondary aromatic amines in rubbers. A further object is to inhibit the deterioration of rubber by a combination of compounds which combination is more effective than either of the individual compounds. A still further object is to increase the resistance of rubber to deterioration without increasing the amount of antioxidant. Still another object is to inhibit the deterioration of rubber by the use of smaller amounts of antioxidant. Other objects are to provide new compositions of matter and to advance the art. Still other objects will appear hereinafter.

The above and other objects may be accomplished in accordance with our invention which comprises incorporating, in a rubber, a mixture of antioxidants, which mixture contains about 25% to about 10% of a member of the group of N,N'-diphenyl-benzidine and C-substituted N,N'-diphenyl-benzidine in which the substituents consist of one or more alkyl, aralkyl, aryl, halogen, alkoxy and aralkoxy groups, and about 75% to about 99.0% of a different secondary aromatic amine devoid of highly polar groups. We have found that such mixture of antioxidants produces an effect much greater than is produced by either one of the constituents of the mixture alone and also greater than the sum of the effects of the two. The benzidine compounds appear to have a boosting effect on the other secondary aromatic amines to greatly increase the effect of such secondary amines so that the resistance to deterioration of a rubber is markedly increased without increasing the amount of antioxidant and a predetermined increase in the resistance of the rubber to deterioration can be obtained with considerably less antioxidant than would otherwise be required. These effects make it possible to obtain superior protection of the rubber with no increase in cost or, if desired, equal protection of the rubber at lower cost.

In accordance with our invention, we have found that N,N'-diphenyl-benzidine and its C-substituted derivatives, which are devoid of highly polar groups such as —COOH, —SO₃H and NO₂, are very effective to improve the antioxidant properties of other secondary aromatic amines. By a "C-substituted N,N'-diphenyl-benzidine," we mean N,N'-diphenyl-benzidine which contains the substituents on the carbons of the benzene rings and not on the nitrogen. While the C-substituted N,N'-diphenyl-benzidines, in which the substituents consist of one or more alkyl, aralkyl, aryl, halogen, alkoxy and aralkoxy groups, may be employed in accordance with our invention, we have found that N,N'-diphenyl-benzidine itself is the most effective and hence is the preferred compound for use in accordance with our invention.

In general, the secondary aromatic amines which are devoid of highly polar groups, such as —COOH, —SO₃H and NO₂ groups, will be improved in their antioxidant properties by the benzidine compounds of our invention. It will be understood that by "secondary aromatic amines," we mean amines in which two valences of the nitrogen are satisfied by aromatic groups only. The aromatic groups may contain substituents, such as alkyl, alkoxy, hydroxy, halogen, amino, sulfonamido, aralkyl, aralkoxy and aryloxy groups. Preferably, the secondary aromatic amines will be secondary diaromatic amines, that is, amines containing a single secondary amino group in which the two valences of the nitrogen are satisfied by aromatic groups. Of these, we prefer the secondary aryl amines which are aromatic amines which, except for the nitrogen of the amino group, consist of carbon and hydrogen. We have found our benzidine compounds to be particularly effective to increase the antioxidant activity of secondary N-aryl naphthylamines, such as the N-phenyl naphthylamines, represented by N - phenyl - beta - naphthylamine. Representative of other secondary aromatic amines, whose antioxidant efficiencies are improved by N,N'-diphenyl-benzidine, are: Para-tolyl-beta-naphthylamine; ortho - tolyl - beta-naphthylamine; N,N'-diphenyl-para-phenylene diamine; para, para'-dimethoxy-diphenylamine; diphenylamine; para, para'-dimethyl-diphenylamine; para-hydroxydiphenylamine; para-alloxy-diphenylamine; para-isopropoxydiphenylamine; N-(para-hydroxyphenyl)-beta-naphthylamine; N - (para-alloxyphenyl)-beta-naphthylamine; N-(para-ethoxyphenyl)-beta-naphthyl-amine; N-(para-chlorophenyl)-beta-naphthyl-amine; N,N' - dinaphthyl - para - phenylene diamine; para, para'-dianilino-diphenylamine and N-(para-tolyl)-N' - (para - tolylsulfonyl) - para-phenylene diamine.

In practice, the benzidine compounds of our invention will constitute from about 2.5% to about 25% of the mixture and preferably from about 5% to about 15%. Less than 1.0% of the benzidine compound usually is insufficient to produce any significant effect. More than 25% of the benzidine compound will produce little, if any, improvement in the antioxidant properties of the mixture and, in some cases, will be less effective than 25%. The antioxidant mixture will usually be formed prior to incorporation into the rubber. However, the mixture may be formed in the rubber by incorporating the antioxidants into the rubber separately in the specified relative proportions and such production of the mixture in the rubber will be understood to constitute an incorporation of the mixture in the rubber within the scope of our claims.

It is to be understood that the term "a rubber" is employed herein and in the claims in a generic sense to include caoutchouc, balata, gutta-percha, latex, synthetic rubber-like materials which are vulcanizable with sulfur and the like.

In order to more clearly illustrate our invention, the preferred modes of carrying the same into effect and the advantageous results to be obtained thereby, a description of the following tests is given:

The tests were made in a rubber mix designed for testing the heat-resistant properties of antioxidants. This stock consists of—

| | |
|---|---|
| Smoked sheet | 100 |
| Zinc oxide | 5 |
| Carbon black | 40 |
| Stearic acid | 1 |
| Salicylic acid | 0.25 |
| Accelerator | 1.95 |
| Sulfur | 1 |
| Antioxidant | 1.5 |

All the stocks were cured for seven minutes at 298° F. The results of tests on each of N-phenyl-beta-naphthyl-amine and N,N'-diphenyl-benzidine separately in the test stock are given in Table I.

*Table I*

| | No antioxidant | N-phenyl-b-naphthyl-amine | N,N'-diphenyl-benzidine |
|---|---|---|---|
| Days aging | Tensile strength | Tensile strength | Tensile strength |
| TESTED AFTER AGING IN THE 121° C. AIR OVEN | | | |
| | Lbs./sq. in. | Lbs./sq. in. | Lbs./sq. in. |
| 0 | 4,100 | 4,125 | 3,825 |
| 2 | 2,075 | 1,625 | 2,475 |
| 5 | 350 | 475 | 1,375 |
| 7 | 225 | 250 | 1,075 |
| TESTED AFTER AGING IN THE 260° F. AIR BOMB | | | |
| ⅓ | 875 | 2,275 | 1,875 |
| ⅔ | 175 | 1,050 | 1,000 |
| 1 | 25 | 300 | 475 |

The common method of determining the degradation of a rubber stock by aging is to measure its tensile strength both before and after aging for various periods of time. In comparing two antioxidants, the losses in tensile strength on aging are compared. This entails the comparison of a series of numbers which generally are not round numbers. In order to render the comparison of the effectiveness of the antioxidants easier, we have in this case compared them to N-phenyl-beta-naphthylamine on a scale in which this material has been assigned a value of 100. This is done by taking the sum of the losses in tensile strength on aging for all tests for each stock and then comparing such sums by arithmetical proportion as illustrated below in which N,N'-diphenyl-benzidine is compared with N-phenyl-beta-naphthylamine.

| N-phenyl-beta-naphthylamine | N,N'-diphenylbenzidine |
|---|---|
| Original tensile—tensile aged=loss in tensile | |
| 4,125−1,625= 2,500 | 3,825−2,475= 1,350 |
| 4,125−  475= 3,650 | 3,825−1,375= 2,450 |
| 4,125−  250= 3,875 | 3,825−1,075= 2,750 |
| 4,125−2,275= 1,850 | 3,825−1,875= 1,950 |
| 4,125−1,050= 3,075 | 3,825−1,000= 2,825 |
| 4,125−  300= 3,825 | 3,825−  475= 3,350 |
| Total loss in tensile=18,775 | =14,675 |

Then if N-phenyl-beta-naphthylamine is assigned a value of 100, the efficiency of N,N'-diphenylbenzidine is $$\frac{18,775}{14,675} \times 100 = 128$$

Calculated in the same way, the efficiency of the stock, containing no antioxidant, is 90.

In Table II are the data, obtained when various mixtures of N-phenyl-beta-naphthylamine and N,N'-diphenyl-benzidine were tested.

*Table II*

| Composition of mixture | No aging | Tensile strength after aging in 121° C. oven for— | | |
|---|---|---|---|---|
| | | 2 days | 5 days | 7 days |
| | Lbs. per sq. in. | Lbs. per sq. in. | Lbs. per sq. in. | Lbs. per sq. in. |
| 25% N,N'-diphenylbenzidine / 75% N-phenyl-b-naphthylamine | 3,400 | 2,125 | 1,300 | 900 |
| 20% N,N'-diphenylbenzidine / 80% N-phenyl-b-naphthylamine | 3,675 | 2,675 | 1,050 | 1,275 |
| 15% N,N'-diphenylbenzidine / 85% N-phenyl-b-naphthylamine | 3,700 | 2,700 | 1,550 | 1,150 |
| 10% N,N'-diphenylbenzidine / 90% N-phenyl-b-naphthylamine | 3,300 | 2,325 | 1,350 | 700 |
| 5% N,N'-diphenylbenzidine / 95% N-phenyl-b-naphthylamine | 3,650 | 2,500 | 1,100 | 775 |
| 2.5% N,N'-diphenylbenzidine / 97.5% N-phenyl-b-naphthylamine | 3,750 | 1,875 | 1,075 | 550 |

| Composition of mixture | Tensile strength after aging in 260° F. bomb for— | | |
|---|---|---|---|
| | ½ day | ⅔ day | 1 day |
| | Lbs. per sq. in. | Lbs. per sq. in. | Lbs. per sq. in. |
| 25% N,N'-diphenylbenzidine / 75% N-phenyl-b-naphthylamine | 1,950 | 1,025 | 225 |
| 20% N,N'-diphenylbenzidine / 80% N-phenyl-b-naphthylamine | 2,425 | 900 | 250 |
| 15% N,N'-diphenylbenzidine / 85% N-phenyl-b-naphthylamine | 2,425 | 850 | 450 |
| 10% N,N'-diphenylbenzidine / 90% N-phenyl-b-naphthylamine | 2,225 | 1,000 | 275 |
| 5% N,N'-diphenylbenzidine / 95% N-phenyl-b-naphthylamine | 2,100 | 650 | 175 |
| 2.5% N,N'-diphenylbenzidine / 97.5% N-phenyl-b-naphthylamine | 1,750 | 600 | 75 |

In Table III, the efficiency values, calculated as in the previous example, are listed, under the heading "Efficiency—Found," for the mixtures in Table II. In Table III is another column headed "Efficiency—Calculated." The figures in this column are the efficiencies that would be obtained if the antioxidant effect of the mixture was the sum of the effects of components of the mixture. These values are obtained as illustrated in the following sample calculation for the 75–25 mixture. The value for N,N'-diphenylbenzidine alone is 128 and for N-phenyl-beta-naphthylamine is 100. Then, 128×0.25+100×0.75=the calculated efficiency for this mixture=32.0+75.0= 107.0. Therefore, this mixture would be expected to have an efficiency of 107% of that of pure N-phenyl-beta-naphthylamine.

*Table III*

| Composition of mixture | | Efficiency | |
|---|---|---|---|
| N-phenyl-beta-naphthyl-amine | N,N'-diphenyl-benzidine | Found | Calculated |
| Per cent | Per cent | | |
| 97.5 | 2.5 | 113.0 | 100.7 |
| 95.0 | 5.0 | 127.5 | 101.4 |
| 90.0 | 10.0 | 157.5 | 102.8 |
| 85.0 | 15.0 | 143.5 | 104.2 |
| 80.0 | 20.0 | 139.0 | 105.6 |
| 75.0 | 25.0 | 146.0 | 107.0 |

The efficiency values, found by actual test, are much higher than would be expected on mixing the two compounds. Even when only 2.5% of N,N'-diphenylbenzidine is used, the antioxidant effect of N-phenyl-beta-naphthylamine is more than doubled, since this material improves the stock from a value of 90 to 100, and the addition of 2.5% of N,N'-diphenylbenzidine improves it from 100 to 113. In the case of the 90–10 mixture the improvement is 575%, a tremendous increase in the value as an antioxidant.

To determine whether or not this property is specific to N,N'-diphenylbenzidines or is common to many other substances, other materials were tested.

*Table IV*

| N-phenyl-beta-naphthylamine plus— | Per cent compound in mixture | Efficiency | |
|---|---|---|---|
| | | Found | Calculated |
| Diphenylamine | 10 | 101.5 | 100.0 |
| Di-ortho-tolylguanidine salt of dicatechol borate | 20 | 95.0 | 99.7 |
| Hydroquinone | 20 | 97.0 | 102.0 |
| N,N'-dinaphthylbenzidine | 20 | 107.0 | 102.0 |

It may be readily seen, from the data in Table IV, that the ability to boost the antioxidant efficiency of N-phenyl-beta-naphthylamine is not a common phenomenon. Even a compound, as closely related to N,N'-diphenylbenzidine as N,N'-dinaphthylbenzidine, has little effect. It is also noteworthy that the di-ortho-tolyl-guanidine salt of dicatechol borate and the hydroquinone seem to cause a decrease in the efficiency of N-phenyl-beta-naphthylamine.

N,N'-diphenyl ethylene diamine has been found to cause a boosting of the efficiency of N-phenyl-beta-naphthylamine but the effect is not nearly so pronounced as with N,N'-diphenylbenzidine.

A further series of tests, in which the effect of three component mixtures was determined, is summarized in Table V.

*Table V*

| Composition of mixture | Efficiency | |
|---|---|---|
| | Found | Calculated |
| N-phenyl-beta-naphthylamine, 90%, N,N'-diphenylbenzidine, 5%, N,N'-diphenyl ethylene diamine, 5% | 158.5 | 102.0 |
| N-phenyl-beta-naphthylamine, 90%, N,N'-diphenylbenzidine, 5%, N,N'-diphenyl-para-phenylene diamine, 5% | 132.5 | 102.0 |
| N-phenyl-beta-naphthylamine, 75%, N,N'-diphenylbenzidine, 20%, N,N'-diphenyl ethylene diamine, 5% | 145.0 | 103.5 |
| N-(para-tolyl)-beta-naphthylamine, 50%, N,N'-diphenylbenzidine, 25%, N,N'-diphenyl ethylene diamine, 25% | 180.5 | 116.0 |
| N-(para-tolyl)-beta-naphthylamine, 75%, N,N'-diphenylbenzidine, 12.5%, N,N'-diphenyl ethylene diamine, 12.5% | 158.5 | 114.5 |

These mixtures show the same large increase in effectiveness over that which would be expected, but they show no advantage over the binary mixtures.

Attempts were made to increase the efficiency of other types of antioxidants by the addition of N,N'-diphenylbenzidine with the results shown in Table VI.

*Table VI*

| Composition of mixture | Efficiency | |
|---|---|---|
| | Found | Calculated |
| N,N'-diphenylbenzidine, 20%; diphenylamine, 80% | 115.5 | 105.5 |
| N,N'-diphenylbenzidine, 10%; diphenylamine, 90% | 110.5 | 103.0 |
| N,N'-diphenylbenzidine, 20%; para-phenyl-phenol, 80% | 98.0 | 95.5 |
| N,N'-diphenylbenzidine, 20%; butyraldehyde-aniline, 80% | 117.5 | 114.5 |
| N,N'-diphenylbenzidine, 20%; N-(para-hydroxyphenyl)-morpholine, 80% | 96.0 | 104.5 |
| N,N'-diphenylbenzidine, 20%; N-(para-tolyl)-N'-(para-tolylsulfonyl)-para-phenylene diamine, 80% | 122.0 | 112.5 |
| N,N'-diphenylbenzidine, 20%; di-ortho-tolylguanidine salt of dicatechol borate, 80% | 95.0 | 102.5 |

The secondary aromatic amines in Table VI, namely, diphenylamine and N-(para-tolyl)-N'-(para-tolylsufonyl)-para-phenylene diamine, are both improved in their antioxidant properties by the addition of N,N'-diphenylbenzidine. Here we again find cases in which a decrease in effectiveness is obtained, particularly in the case of N-(para-hydroxyphenyl)-morpholine.

It will be understood that the preceding tests and the specific embodiments disclosed are given for illustrative purposes only and that many variations and modifications may be made therein without departing from the spirit or scope of our invention and we intend to claim our invention broadly as in the appended claims. It will be evident that other antioxidant mixtures than those specifically disclosed may be employed and that the antioxidant mixtures may be used in other rubbers and rubber stocks.

In carrying out the literature method of preparing N,N'-diphenylbenzidine (Kadiera Ber. 38, 3576 (1905)), diphenylamine is treated with fuming sulfuric acid. The product is washed with water to remove the acid and with alcohol to remove the unchanged diphenylamine. The product so obtained contains, besides N,N'-diphenylbenzidine, high melting compounds which are probably the result of further reaction between N,N'-diphenylbenzidine and diphenylamine or between two molecules of the former. Pure N,N'-diphenylbenzidine may be obtained from this crude product by extraction with toluene. The yield of pure material is very poor, but the yield of crude material is about 60% of theory. The crude N,N'-diphenylbenzidine has been tested as a replacement for the pure compound and is found to give an efficiency value of 124 as compared to 128 for pure N,N'-diphenylbenzidine. Therefore, for the purpose of this invention, the crude material may be used instead of pure N,N'-diphenylbenzidine.

From the above, it will be seen that we have provided a method for increasing the resistance of a rubber to deterioration, particularly at elevated temperatures, without increasing the amount of antioxidant employed. Also, it will be seen that we can obtain a predetermined resistance to deterioration in a rubber by the use of smaller amounts of antioxidant. Because of the small amount of N,N'-diphenylbenzidine employed in the mixture, the cost of such compound has very little effect on the cost of the resulting rubber product and hence we are able to obtain improved stabilization with substantially no increase in cost or, if desired, to obtain a predetermined degree of stabilization at substantially lower cost.

We claim:

1. The method of inhibiting the deterioration of a rubber at elevated temperatures in the presence of oxygen which comprises incorporating in the rubber a mixture containing about 25% to 1.0% of a member of the group consisting of N,N'-diphenyl-benzidine and C-substituted N,N'-diphenyl-benzidine in which the substituents consist of one or more alkyl, aralkyl, aryl, halogen, alkoxy and aralkoxy groups and about 75% to 99.0% of a different secondary aromatic amine devoid of strongly negative groups of the character of —COOH, —SO$_3$H and NO$_2$ groups.

2. The method of inhibiting the deterioration of a rubber at elevated temperatures in the presence of oxygen which comprises incorporating in the rubber a mixture containing about 25% to 1.0% of N,N'-diphenyl-benzidine and about 75% to 99.0% of a different secondary aromatic amine devoid of strongly negative groups of the character of —COOH, —SO$_3$H and NO$_2$ groups.

3. The method of inhibiting the deterioration of rubber at elevated temperatures in the presence of oxygen which comprises incorporating in the rubber a mixture containing about 25% to about 2.5% of a member of the group consisting of N,N'-diphenyl-benzidine and C-substituted N,N'-diphenyl-benzidine in which the substituents consist of one or more alkyl, aralkyl, aryl, halogen, alkoxy and aralkoxy groups and about 75% to about 97.5% of a secondary diaryl amine.

4. The method of inhibiting the deterioration of rubber at elevated temperatures in the presence of oxygen which comprises incorporating in the rubber a mixture containing about 25% to about 2.5% of a member of the group consisting of N,N'-diphenyl-benzidine and C-substituted N,N'-diphenyl-benzidine in which the substituents consist of one or more alkyl, aralkyl, aryl, halogen, alkoxy and aralkoxy groups and about 75% to about 97.5% of a secondary N-aryl naphthylamine in which the aryl group is of the benzene series.

5. The method of inhibiting the deterioration of rubber at elevated temperatures in the presence of oxygen which comprises incorporating in the rubber a mixture containing about 25% to about 2.5% of N,N'-diphenyl-benzidine and about 75% to about 97.5% of a secondary diaryl amine.

6. The method of inhibiting the deterioration of rubber at elevated temperatures in the presence of oxygen which comprises incorporating in the rubber a mixture containing about 25% to about 2.5% of N,N'-diphenyl-benzidine and about 75% to about 97.5% of a secondary N-aryl naphthylamine in which the aryl group is of the benzene series.

7. The method of inhibiting the deterioration of rubber at elevated temperatures in the presence of oxygen which comprises incorporating in the rubber a mixture containing about 25% to about 2.5% of N,N'-diphenyl-benzidine and about 75% to about 97.5% of a secondary N-phenyl naphthylamine.

8. The method of inhibiting the deterioration of rubber at elevated temperatures in the presence of oxygen which comprises incorporating in the rubber a mixture containing about 25% to about 2.5% of N,N'-diphenyl-benzidine and about 75% to about 97.5% of N-phenyl-beta-naphthylamine.

9. The method of inhibiting the deterioration of rubber at elevated temperatures in the presence of oxygen which comprises incorporating in the rubber a mixture containing about 25% to about 2.5% of N,N'-diphenyl-benzidine and about 75% to about 97.5% of N-(para-tolyl)-beta-naphthylamine.

10. A rubber having incorporated therein a mixture containing about 25% to 1.0% of a member of the group consisting of N,N'-diphenyl-benzidine and C-substituted N,N'-diphenyl-benzidine in which the substituents consist of one or more alkyl, aralkyl, aryl, halogen, alkoxy and aralkoxy groups and about 75% to 99.0% of a different secondary aromatic amine devoid of strongly negative groups of the character of —COOH, —SO$_3$H and NO$_2$ groups.

11. A rubber having incorporated therein a mixture containing about 25% to 1.0% of a member of the group consisting of N,N'-diphenyl-benzidine and C-substituted N,N'-diphenyl-benzidine in which the substituents consist of one or more alkyl, aralkyl, aryl, halogen, alkoxy and aralkoxy groups and about 75% to 99.0% of a secondary diaromatic amine devoid of strongly negative groups of the character of —COOH, —SO$_3$H and —NO$_2$ groups.

12. Rubber having incorporated therein a mixture containing about 25% to about 2.5% of a member of the group consisting of N,N'-diphenyl-benzidine and C-substituted N,N'-diphenyl-benzidine in which the substituents consist of one or more alkyl, aralkyl, aryl, halogen, alkoxy and aralkoxy groups and about 75% to about 97.5% of a secondary diaryl amine.

13. Rubber having incorporated therein a mixture containing about 25% to about 2.5% of a member of the group consisting of N,N'-diphenyl-benzidine and C-substituted N,N'-diphenyl-benzidine in which the substituents consist of one or more alkyl, aralkyl, aryl, halogen, alkoxy and aralkoxy groups and about 75% to about 97.5% of a secondary N-aryl naphthylamine in which the aryl group is of the benzene series.

14. Rubber having incorporated therein a mixture containing about 25% to about 2.5% of N,N'-diphenyl-benzidine and about 75% to about 97.5% of a different secondary aromatic amine devoid of strongly negative groups of the character of —COOH, —SO$_3$H and NO$_2$ groups.

15. Rubber having incorporated therein a mixture containing about 25% to about 2.5% of N,N'-diphenyl-benzidine and about 75% to about 97.5% of a secondary diaromatic amine devoid of strongly negative groups of the character of —COOH, —SO₃H and —NO₂ groups.

16. Rubber having incorporated therein a mixture containing about 25% to about 2.5% of N,N'-diphenyl-benzidine and about 75% to about 97.5% of a secondary diaryl amine.

17. Rubber having incorporated therein a mixture containing about 25% to about 2.5% of N,N'-diphenyl-benzidine and about 75% to about 97.5% of a secondary N-aryl naphthylamine in which the aryl group is of the benzene series.

18. Rubber having incorporated therein a mixture containing about 25% to about 2.5% of N,N'-diphenyl-benzidine and about 75% to about 97.5% of a secondary N-phenyl naphthylamine.

19. Rubber having incorporated therein a mixture containing about 25% to about 2.5% of N,N'-diphenyl-benzidine and about 75% to about 97.5% of N-phenyl-beta-naphthylamine.

20. Rubber having incorporated therein a mixture containing about 25% to about 2.5% of N,N'-diphenyl-benzidine and about 75% to about 97.5% of N-(para-tolyl)-beta-naphthylamine.

ARTHUR M. NEAL.
JOHN R. VINCENT.